United States Patent
Cotte et al.

[11] Patent Number: 5,939,223
[45] Date of Patent: Aug. 17, 1999

[54] LITHIUM POLYMER ELECTROLYTE BATTERY FOR SUB-AMBIENT TEMPERATURE APPLICATIONS

[75] Inventors: John M. Cotte, New Fairfield, Conn.; Madhav Datta, Yorktown Heights, N.Y.; Ravindra Shenoy, Santa Barbara, Calif.

[73] Assignee: International Business Machines Corporation, Armonk, N.Y.

[21] Appl. No.: 08/879,436

[22] Filed: Jun. 20, 1997

Related U.S. Application Data

[63] Continuation-in-part of application No. 08/727,096, Oct. 8, 1996, abandoned.

[51] Int. Cl.[6] .............................. H01M 6/18; H01M 4/50
[52] U.S. Cl. .................. 429/127; 429/314; 429/331; 429/217; 429/224; 429/232
[58] Field of Search ..................... 429/127, 197, 429/194, 191, 192, 217, 224, 232, 331, 314

[56] References Cited

U.S. PATENT DOCUMENTS 5,474,862  12/1995  Okuno et al. ........................ 429/197
5,552,239   9/1996  Gozdz et al. .......................... 429/94
5,558,957   9/1996  Datta et al. ........................... 429/127
5,571,637  11/1996  Idota .................................. 429/197 X

*Primary Examiner*—John S. Maples
*Attorney, Agent, or Firm*—Domenica N.S. Hartman; Gary M. Hartman; Casey P. August

[57] ABSTRACT

A primary lithium battery particularly adapted for use in self-contained self-powered devices (SSPD) for mobile communication and computing products, such as radio frequency identification tags, PCMCIA cards, and smart cards. The battery has a flexible and compact design, and utilizes a solid polymer electrolyte membrane that preferably has a polyacrylonitrile matrix. Performance of the electrolyte membrane is optimized by controlling the amount of aprotic organic solvents within the membrane within a prescribed range of ratios. In so doing, the performance characteristics of the battery closely approximate that of conventional liquid electrolytes without the safety hazards associated with the risk of liquid electrolyte leakage, and exhibit enhanced performance at sub-ambient temperatures. A further feature is that the battery's cathode is encapsulated within a polymeric matrix that eliminates the exposure hazard posed by lithium intercalation compounds used within the cathode.

21 Claims, 2 Drawing Sheets

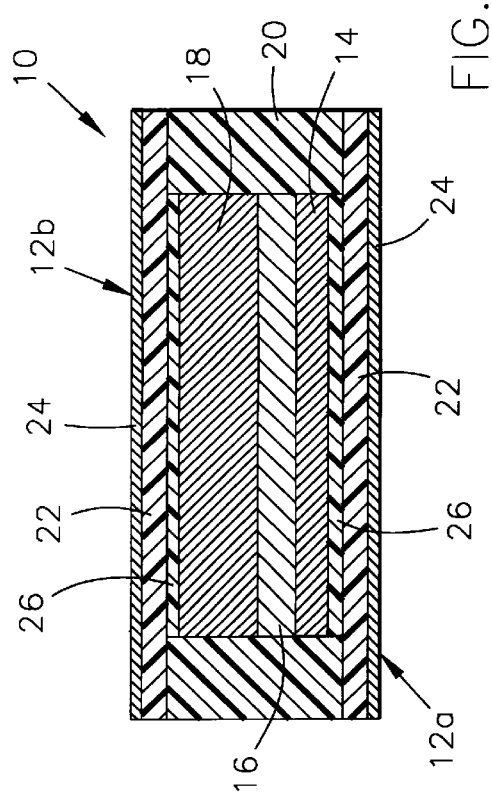
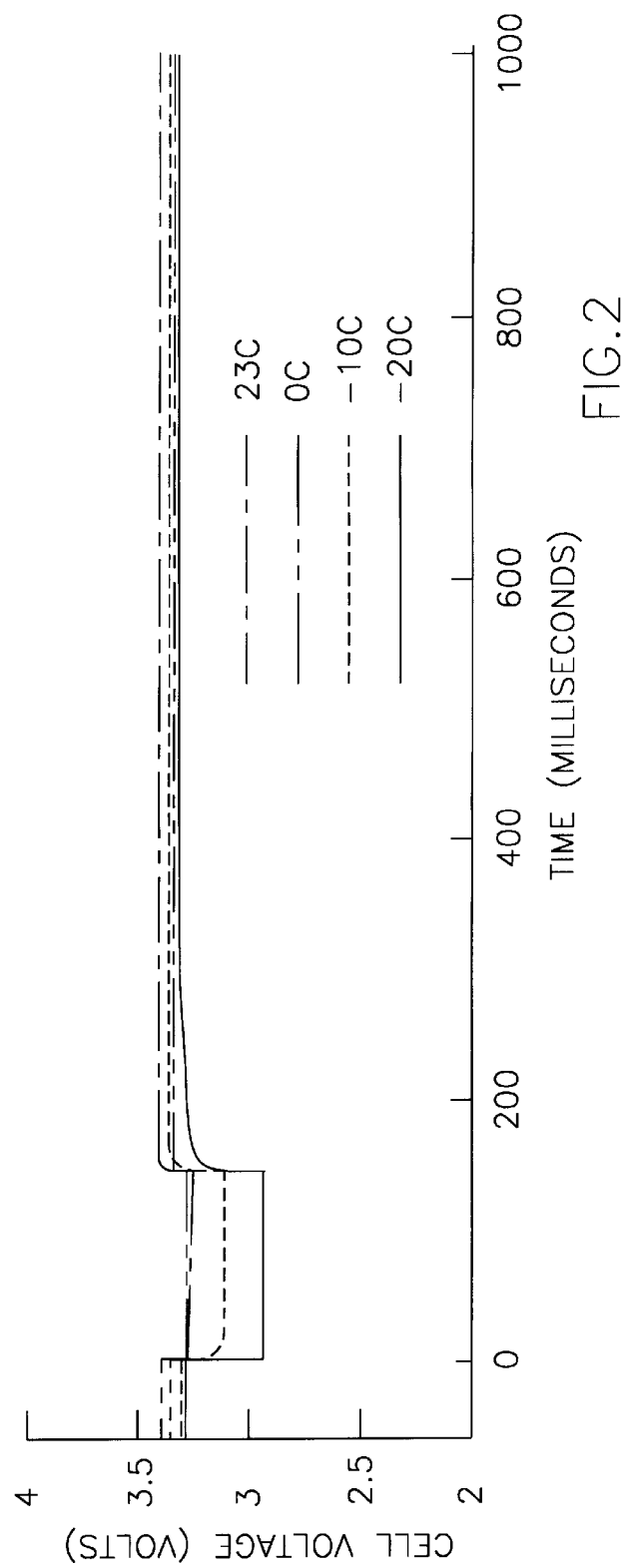
FIG.1
FIG.2

LITHIUM POLYMER ELECTROLYTE BATTERY FOR SUB-AMBIENT TEMPERATURE APPLICATIONS

CROSS-REFERENCE

This application is a continuation-in-part of application Ser. No. 08/727,096, filed on Oct. 8, 1996, now abandoned.

The invention disclosed and claimed herein is related to the invention disclosed and claimed in application Ser. No. 08/614,982 which was filed on Mar. 12, 1996 and is assigned to the same assignee as the instant invention.

BACKGROUND OF INVENTION

1. Field of the Invention

Generally, this invention relates to a lithium battery for use in self-contained self-powered devices (SSPD) such as radio frequency identification tags, PCMCIA cards, and smart cards. More particularly, this invention relates to an improved electrolyte membrane for flexible lithium batteries adapted for use in self-contained self-powered devices.

2. Description of Prior Art

Self-contained self-powered portable devices (SSPD) encompass an increasingly large market of mobile communication and computing products such as radio frequency identification (RF-ID) tags, PCMCIA cards, and smart cards. For a battery to be useable in such applications, it must deliver high energy density and specific energy with low rates of self-discharge. Primary (non-rechargeable) lithium batteries have been found particularly well suited for meeting these requirements. Since SSPDs are widely employed within products offered in the consumer microelectronics market, safety is an important design criterion. Accordingly, batteries used in such devices are generally constructed of all solid components, including the electrolyte in order to avoid the hazard of electrolyte leakage. Such electrolytes have been formed as a solid polymer electrolyte composed of a polymer membrane having a suitable electrolyte contained within its matrix.

The use of polyethylene oxide (PEO) as a solid polymer electrolyte membrane material for a flexible lithium battery has been proposed in the prior art. Solid electrolytes formed with this material have exhibited satisfactory ambient temperature conductivity, and provide good performance at sub-ambient temperatures when used to deliver short current pulses of about thirty $\mu A/cm^2$ per for durations of up to about 10 milliseconds. Also, polyethylene oxide-based lithium batteries can be readily manufactured using well-established fabrication techniques, yielding a flexible battery that is both reliable and cost-efficient.

While polyethylene oxide-based electrolyte membranes have achieved many design criteria for SSPD applications, further improvements would be desirable, such as higher conductivity at sub-ambient temperatures. Polyethylene-oxide-based electrolyte membranes generally exhibit insufficient conductivity to attain current pulses on the order of about 100 $\mu A/cm^2$ for about 100 milliseconds or more at sub-ambient temperatures, i.e., on the order of about 0° C. and less. Consequently, primary lithium batteries with polyethylene oxide-based electrolyte membranes are not ideally suited for SSPDs that specifically require extensive low temperature operations. If the sensitivity of a SSPD battery to temperature change could be reduced, the battery would be significantly more useful in a wider array of consumer microelectronics products, and enable SSPDs to operate reliably under the sub-ambient temperature conditions to which such products are occasionally exposed.

Accordingly, what is needed is a battery ideally suited for use in SSPD applications, necessitating that such a battery have several demanding characteristics. First, the battery must be constructed of all solid components while still being flexible and compact. Secondly, the battery should exhibit similar conductivity characteristics to primary batteries with liquid electrolytes. Thirdly, the battery should also be readily manufacturable in a manner that yields a battery that is both reliable and cost-efficient. Finally, the battery also must be able to maintain a necessary minimum level of conductivity at sub-ambient temperatures.

SUMMARY OF THE INVENTION

It is an object of this invention to provide a solid polymer electrolyte battery for use in microelectronics products.

It is another object of this invention that the battery is both flexible and compact.

It is a further object of this invention that the battery is readily manufacturable in a manner that yields a reliable and cost-effective battery.

It is yet another object of this invention that the battery has a polymer electrolyte with comparable conductivity properties to that of liquid electrolytes at ambient temperature.

It is still another object of this invention that such a battery exhibits sufficient conductivity such that the battery is usable in demanding applications such as SSPDs at sub-ambient temperatures of as low as about −20° C.

It is still a further object of this invention that the battery is constructed with components that are fabricated in a manner that significantly reduces exposure hazards associated with the materials from which the components are formed.

In accordance with a preferred embodiment of this invention, these and other objects and advantages are accomplished as follows.

This invention is generally a lithium battery optimized for use in consumer microelectronics products, and particularly self-contained self-powered devices (SSPD) such as radio frequency identification tags, PCMCIA cards, and smart cards. The battery is generally composed of all solid components, including a lithium foil anode, polymer electrolyte membrane and a foil cathode sandwiched between a pair of flexible current collectors, yielding a battery that is sufficiently flexible and compact to permit its use in various SSPD applications. In addition, the battery of this invention is characterized by enhanced power generating capabilities at sub-ambient temperatures as compared to prior art solid electrolyte batteries, and is therefore well suited for more demanding SSPD applications.

To achieve the above, the battery of this invention includes a flexible polymer electrolyte membrane composed of an electrolyte within a polymeric binder. The electrolyte includes a lithium salt and an organic aprotic solvent composed of ethylene carbonate, propylene carbonate and gamma-butyrolactone in a predetermined ratio. Flexible primary batteries constructed in accordance with the above are capable of exhibiting a cell voltage of at least about 2.5 volts when discharged with a current pulse of about 100 microamperes, a pulse on-time of about 150 milliseconds and a pulse period of about one second while at a temperature of about 0° C. to about −20° C.

A preferred aspect is that a flexible primary battery constructed in accordance with this invention utilizes a flexible foil cathode within an encapsulating matrix, such that hazards associated with handling the cathode and exposure to its active ingredients are overcome. Preferably, the encapsulating matrix is composed of a modified version of the same polymeric binder used to form the polymer electrolyte membrane.

In view of the above, it can be seen that a flexible primary battery produced in accordance with the above is particularly well suited for use in SSPD applications and the like. The battery can be fabricated to have a flexible, compact and rugged construction, while also enabling a wide range of uses in SSPD and similar applications due to its enhanced performance at sub-ambient temperatures. Furthermore, batteries according to this invention are able to function satisfactorily at lower temperatures than was possible before by optimizing the ratio of the aprotic organic solvents within the electrolyte.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 shows in cross-section the construction of a flexible primary battery in accordance with a preferred embodiment of this invention;

FIG. 2 represents cell voltage variation during individual current pulses at various operating temperatures for flexible primary batteries fabricated in accordance with this invention.

DETAILED DESCRIPTION OF THE PREFERRED EMBODIMENT

Figure 3:
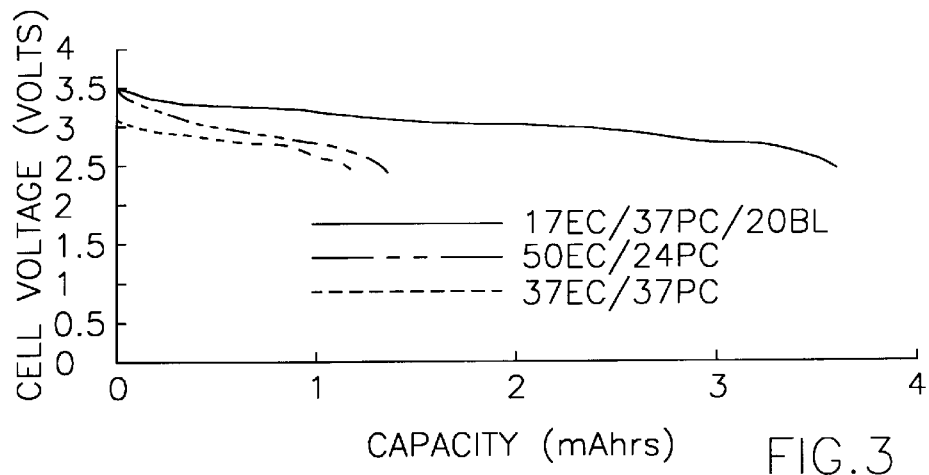
FIG. 3 is a graph of cell voltage vs. capacity for lithium primary batteries having polymer electrolytes in accordance with this invention.

The present invention provides a primary lithium battery for use in SSPD applications, in which the battery is constructed of all solid components, including a solid polymer-based electrolyte membrane, yet is characterized by power generating and conductivity properties comparable to liquid electrolytes used in conventional primary batteries. A suitable battery construction is represented in cross-section in FIG. 1. The battery 10 generally includes a pair of current collectors 12a and 12b, a lithium foil anode 14, a solid polymeric electrolyte membrane 16, and a flexible cathode 18. A polymer spacer 20 circumscribes the anode 14, electrolyte membrane 16 and cathode 18 as shown. The battery 10 has a planar shape, and can be configured to have essentially any suitable size and peripheral shape. As those skilled in the art will recognize, a suitable shape and size for the battery 10 will depend on the particular application for the SSPD and the cell capacity required.

As shown in FIG. 1, the flexible current collectors 12a and 12b have a laminar construction with a thickness of about forty micrometers to about one hundred micrometers. In accordance with this invention, the current collectors 12a and 12b perform the important function of providing flexible packaging for the battery 10. The current collectors 12a and 12b also encapsulate the lithium foil anode 14, the electrolyte membrane 16 and cathode 18 to protect these components from air and moisture. The current collectors 12a and 12b are preferably composed of a polymeric sheet 22 with a metal barrier film 24 deposited on one of its surfaces and a metal foil 26 formed on its opposite surface. The polymeric sheet 22 is preferably polyester, though other suitable materials could be used, and has a thickness of about twenty-five to about thirty micrometers, with a preferred thickness being about twenty-five micrometers. The metal foil 26 is preferably a copper foil having a thickness of about fifteen to about fifty micrometers, and preferably about fifteen micrometers. As shown in FIG. 1, the metal foils 26 do not cover the entire surface of their respective polymeric sheets 22, such that the entire perimeter of the polymeric sheet 22 remains exposed. The barrier film 24 serves as a barrier to moisture and air for the battery 10, and it is preferably copper or aluminum having a thickness of about 200 to about 5000 angstroms, with a preferred thickness of about 1000 angstroms. Those skilled in the art will appreciate that other metals and metal alloys could be used as suitable substitutes for those noted for the barrier films 24 and the metal foils 26.

The spacer 20 and the barrier films 24 form the primary structural members of the battery 10, and eliminate the conventional requirement for separate and additional packaging for the battery 10. The spacer 20 abuts and seals the exposed perimeter of each polymeric sheet 22 to form a cavity that completely circumscribes and encloses the lithium foil anode 14, the electrolyte membrane 16, and the cathode 18. The spacer 20 is preferably formed of high density polyethylene, a polyester such as MYLAR, or another heat-sealable polymeric material, and its height Is roughly the same as the combined thicknesses of the metal foils 26, the lithium foil anode 14, the electrolyte membrane 16 and the cathode 18, while its width must be sufficient to form a durable and reliable seal with the polymeric sheets 22. In practice, the width of the spacer is about one to about five millimeters, with a preferred width being about one millimeter.

The lithium foil anode 14 has a thickness of about thirty to about one hundred micrometers, and preferably about thirty micrometers, but it is otherwise conventional in terms of lithium anodes used in primary lithium batteries. In contrast, the cathode 18 has a novel construction that employs a polymer matrix. As is conventional, the cathode 18 is generally composed of a lithium intercalation compound, such as highly reactive manganese dioxide ($MnO_2$). In addition, the thickness of the cathode 18 is about 200 micrometers, with a suitable range being about 100 to about 300 micrometers. Contrary to prior practices, the lithium intercalation compound is provided in a powder form and dispersed within a polymeric matrix, whose particular formulation will be discussed in greater detail below, so as to avoid hazards associated with exposure to the intercalation compound. Because the lithium intercalation compound is encapsulated within a protective polymeric matrix, the battery 10 can be manufactured with significantly reduced risks and difficulty associated with handling of a lithium intercalation compound in powder form. Secondly, the polymer-encapsulated cathode 18 of this invention resolves the safety problems that can arise if the battery 10 were accidentally or intentionally opened to expose the cathode 18.

The solid polymeric electrolyte membrane 16 is a key element in the construction of the battery 10 for use in SSPD applications, in that it eliminates the possibility of electrolyte leakage if the battery 10 is accidentally or intentionally opened after manufacture. In accordance with this invention, the solid electrolyte membrane 16 is also specifically formulated to enhance the performance of the battery 10, particularly at sub-ambient temperatures, i.e., temperatures on the order of about 0° C. and less. In a preferred embodiment, the electrolyte membrane 16 employs polyacrylonitrile (PAN) as a polymer binder in whose matrix is dispersed a liquid electrolyte composed of a lithium salt solution and aprotic organic solvents. The polyacrylonitrile-based electrolytic membrane 16 of this invention exhibits significantly better conductivity than prior art PEO-based polymer electrolyte membranes, with an ambient temperature conductivity of at least about $10^{-3}\Omega^{-1}$ $cm^{-1}$, which is comparable to liquid electrolytes. The membrane 16 captures the liquid electrolyte solution within its polyacrylonitrile matrix such that lithium ions provided by the electrolyte move through the membrane 16 in a manner similar to liquid electrolytes, in contrast to the "hopping" mechanism exhibited by PEO-type electrolyte membranes of the prior art. A suitable thickness for the polymer electrolyte membrane is about twenty-five to about one hundred micrometers.

The lithium salt is preferably lithium triflate ($LiCF_3SO_3$), though other suitable compounds could be substituted for or used in addition to lithium triflate, such as $LiAsF_6$, $LiPF_6$, $LiClO_4$ and $Li(CF_3SO_2)_2N$. The aprotic organic solvents are ethylene carbonate, propylene carbonate, and gamma-butyrolactone. In accordance with this invention, the ratio of ethylene carbonate to propylene carbonate to gamma-butyrolactone is critical to the temperature sensitivity of the electrolyte membrane 16, and therefore must be maintained within an acceptable range. The effect that this ratio has on the power generating and electrical properties of electrolytic membrane 16 are discussed below with reference to tests performed on composition of this invention for the membrane 16, whose formulation is noted in Table I.

TABLE I

|  | wt. % | mol. % |
|---|---|---|
| Polyacrylonitrile | 12.8 | 21 |
| Lithium Triflate | 9.0 | 5 |
| Ethylene Carbonate | 30.3 | 30 |
| Propylene Carbonate | 28.1 | 24 |
| γ-Butyrolactone | 19.8 | 20 |

Electrolyte membranes 16 having the above formulation were prepared by first mixing appropriate amounts of ethylene carbonate, γ-butyrolactone, and lithium salt in propylene carbonate, and then adding polyacrylonitrile powder. The solution was stirred to form a smooth opaque solution, and then heated to about 120° C. to about 150° C. to form a transparent, viscous homogeneous solution. The solution was then poured and pressed between two rigid surfaces with appropriate spacing to achieve a desired thickness for the membranes 16. Suitable materials for the rigid surfaces include glass, metal, and metal coated with TEFLON. The assembly was then cooled, yielding freestanding polymer electrolyte membranes 16 upon separation from the rigid surfaces. A suitable alternative to the above steps would be a continuous process by which the solution is heated and extruded between rigid plates that are passed through a pair of rollers.

FIG. 2 represents cell voltage variation of batteries of the type shown in FIG. 1, but with their electrolyte membranes 16 being formed from the formulation in Table I. The data represented in FIG. 2 was recorded during individual current pulses at operating temperatures of between about −20 and 23° C., during which the batteries were discharged with a current pulse of about 100 $\mu A/cm^2$, a pulse on-time of about 150 milliseconds, and an off-pulse period of about 850 milliseconds for a pulse period (cycle) of about one second. Cell voltage was monitored as a function of time during the pulse discharge and during the relaxation period. The criterion established for acceptable pulse discharge performance was the ability to maintain a battery cell voltage of greater than about 2.5 volts, in that a cell voltage of 2.5 and less was deemed insufficient for use in standard SSPD applications with CMOS-based volatile memory.

FIG. 3 shows cell voltage versus capacity for a constant current discharge for lithium primary batteries with polymer electrolytes in accordance with this invention (solid line) and in accordance with the Ser. No. 08/614,982 invention (dotted and dashed lines).

The above illustrates the manner in which a significantly enhanced sub-ambient performance can be achieved for a primary lithium battery of the type shown in FIG. 1. As noted above, the use of the solid polyacrylonitrile-based electrolyte membrane 16 is also important from the standpoint of forming a battery that poses minimal exposure hazard to the liquid electrolyte contained within the polymer matrix of the membrane 16. In accordance with the following, exposure hazards posed by the materials used in the battery 10 of this invention are further reduced by the preferred construction of the cathode 18. Specifically, the cathode 18 preferably employs a polymer matrix in which its lithium intercalation compound is dispersed and encapsulated. Furthermore, the material for the polyacrylonitrile-based electrolyte membrane has been found to be highly suitable for this purpose. Accordingly, the manufacture of the battery 10 includes the blending of a suitable lithium intercalation compound, such as manganese dioxide, into a polymer solution formulated in accordance with the formulations described in Table II.

A suitable method for forming the cathode 18 entails introducing a manganese dioxide powder and carbon, in such forms as activated carbon or carbon black, into a solution of polyacrylonitrile-based electrolyte membrane material, which may be prepared in a manner as described above but having the optimized composition shown in Table II.

TABLE II

|  | wt. % | mol. % |
|---|---|---|
| Polyacrylonitrile | 12.5 | 21 |
| Lithium Triflate | 8.8 | 5 |
| Ethylene Carbonate | 16.8 | 17 |
| Propylene Carbonate | 42.5 | 37 |
| γ-Butyrolactone | 19.4 | 20 |

Figure 5:
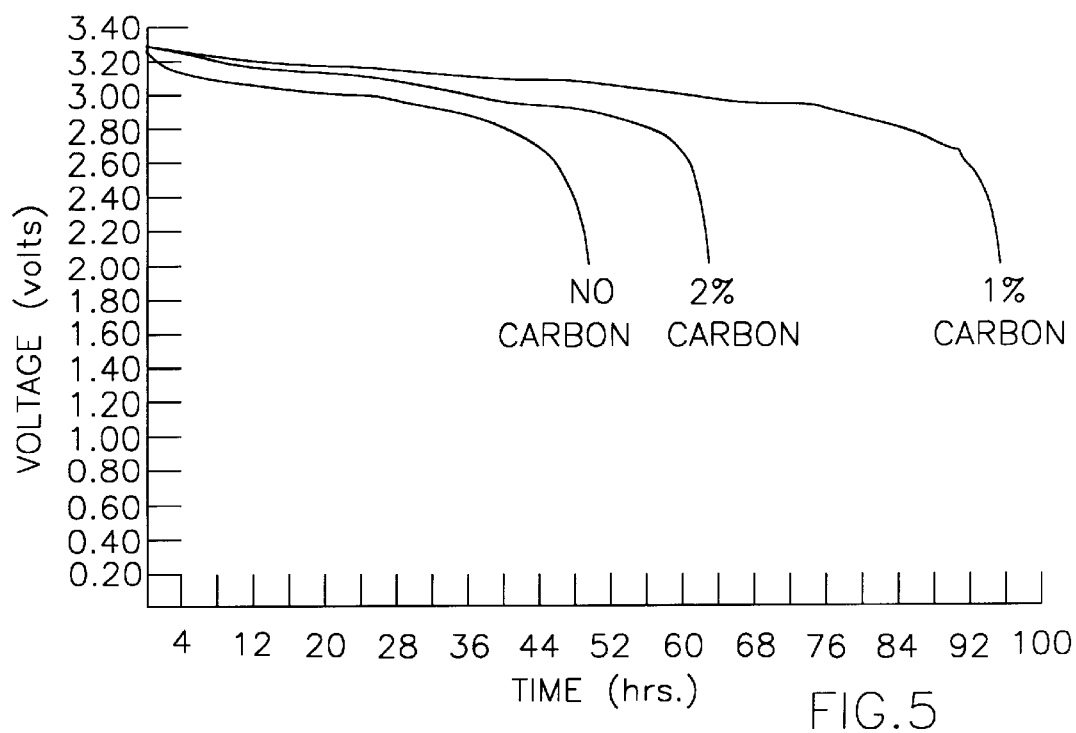
FIG. 5 is a graph of cell voltage vs. continuous discharge time for three flexible batteries fabricated in accordance with the invention, each having a different amount of carbon in its flexible cathode and copper metal foil in their current collectors.

Suitable weight percentages for the individual constituents of the cathode 18 are about fifty to about seventy weight percent manganese dioxide powder, about twenty-five to about fifty weight percent membrane solution, and up to about five weight percent carbon. As shown in FIG. 5, the carbon is preferably between about 1 and 2 weight percent; optimally about 1 weight percent. Preferred weight percent ratios for the manganese dioxide powder, membrane solution and carbon are about 50:45:5 to about 70:25:5. More preferably the ratios are between about 58:40:2 to about 59:40:1; optimally about 59:40:1. The result is a thick paste from which the cathode 18 can be formed in a manner similar to the fabrication of the polymer electrolyte membrane 16. Free standing cathodes 18 can be readily formed having suitable thicknesses of about 25 to about 250 micrometers.

Assembly of battery 10 with the above described components is generally as follows. The current collectors 12a and 12b are fabricated by forming each copper metal foil 26 on one surface of a corresponding polymeric sheet 22, preferably using photolithography and wet chemical etching techniques, and then forming the metal barrier films 24 by coating the opposite surfaces of each sheet 22 using precision deposition methods such as sputtering or evaporation techniques. Current collectors 12a and 12b are formed to a thickness of about 15 micrometers on one surface of the polymeric sheet 22, which preferably has a thickness of about 25 micrometers. Either a photoresist mask or a metal mask can be suitably used to delineate an appropriate pattern for the metal foil 26 in accordance with techniques known in the art.

Figure 4:
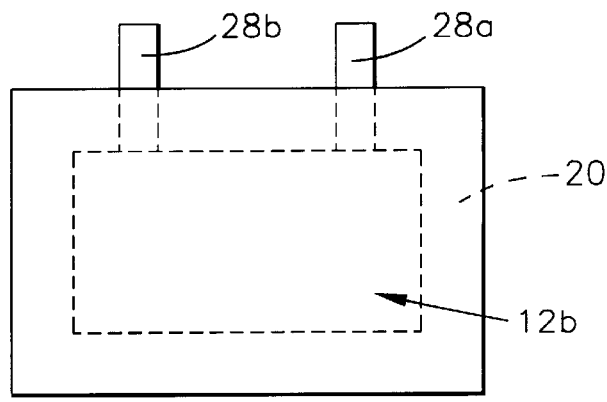
FIG. 4 is a top view of the battery of FIG. 1.

With the mask in place, metal foil 26 can be etched back such that polymeric sheet 22 is exposed at he perimeter of the surface while at the same time current collector leads 28a and 28b, shown in FIG. 4, are formed. Collector lead 28a is associated with anode 14 and collector lead 28b is associated with cathode 18. As shown in FIG. 2, collector leads 28a and 28b are rectangular tab-like structures protruding from the side of the battery. While this arrangement has been found to be particularly useful when the battery is used with RF-ID tags, it will be recognized that other current collector lead arrangements and configurations are also possible, and may be necessary, depending on the application in which the battery is used, and that such leads need not be of the same configuration. The preferred etching technique is a wet chemical etch using a mixture of acetic, nitric and phosphoric acids, though dry chemical or electrochemical etching techniques could also be used. The preferred photolithographic and wet chemical etching techniques are known in the art, and therefore will not be discussed in further detail.

Alternatively, the current collectors 12a and 12b could be formed by stamping in accordance with techniques known in the art. The polymer electrolyte membrane 16 and cathode 18 are fabricated in accordance with the methods described previously, while lithium foil 14 can be formed in a conventional manner to acquire the desired thickness of about 30 to about 700 micrometers.

Battery 10 is then assembled within an inert atmosphere by laying one of the current collectors 12a on a suitable surface, with its metal foil 26 facing up. The lithium foil 14 is then placed on top of current collector 12a, and polymer electrolyte membrane 16 is placed on top of the lithium foil 14. Cathode 18 is then placed on top of the polymer electrolyte membrane 16, and battery 10 is enclosed around its periphery with the polymeric spacer 20. Finally, the battery 10 is covered with the remaining current collector 12b, such that its metal foil 26 abuts the cathode 18. The battery 10 is then heat sealed at a temperature of about 170° C., such that a seal forms between the exposed edges of the polymeric sheet 22 and the spacer 20. The battery 10 can then be removed from the inert atmosphere, after which excess polymeric sheet 22 is trimmed and portions of the metal foils 26 of the current collectors 12a and 12b are exposed to form leads (not shown) through which power can be extracted from the battery 10. The battery 10 is then tested against appropriate performance criteria.

In operation, the battery 10 is ideally suited for use in SSPDs such as radio frequency identification tags, PCMCIA cards, and smart cards. If the electrolyte membrane 16 is formed from the composition of Table I, the battery 10 is able to perform suitably at temperatures down to about −20° C., characterized by the ability to deliver at least about 100 $\mu A/cm^2$ for a pulse on-time of about 150 milliseconds and a pulse period of about one second, while sustaining a minimum voltage of greater than 2.5 volts.

From the above, it can be seen that this invention is uniquely capable of performing well in SSPD applications, since the battery 10 provides for a rugged flexible construction yet employs a solid polymer electrolyte membrane 16 that has electrical and power generating properties similar to liquid electrolyte batteries. The solid construction of the battery 10 is particularly necessary for use in self-contained applications that, by the nature of their use, expose the battery 10 to hostile environmental conditions. Furthermore, the battery 10 of this invention enables a wide range of uses in SSPD and similar applications due to Its enhanced performance at sub-ambient temperatures. In particular, use of polyacrylonitrile as the polymer matrix for the electrolyte membrane 16 enables the battery 10 to exhibit conductivity at ambient temperatures on the order of liquid electrolytes employed with conventional primary batteries, and further enables the battery 10 to function at temperatures that are lower than was possible before by optimizing the ratio of the aprotic organic solvents within the electrolyte membrane 16.

In addition to the above, the exposure hazard of the lithium intercalation compounds within the cathode 18 is eliminated by the manner in which the cathode 18 is encapsulated within a polymeric matrix that is preferably composed of the same material as the electrolyte membrane 16. Therefore, the disclosed battery 10 is significantly safer than both liquid electrolyte batteries and prior art solid electrolyte batteries.

While this invention has been described in terms of a preferred embodiment, it is apparent that one skilled in the art could adopt other forms. For example, other materials could be used or developed as substitutes for those noted, and differently assembly techniques and procedures could be employed. Accordingly, the scope of our invention is to be limited only by the following, claims.

What is claimed is:

1. A flexible primary battery suitable for microelectronics applications, the battery comprising a flexible polymer electrolyte membrane having an electrolyte contained within a polymeric binder, the electrolyte comprising a lithium salt and an organic aprotic solvent solution, the organic aprotic solvent solution comprising ethylene carbonate, propylene carbonate and gamma-butyrolactone in a molar ratio of about 1.0:0.8:0.67.

2. A flexible primary battery as recited in claim 1 wherein the polymeric binder is polyacrylonitrile.

3. A flexible primary battery as recited in claim 1 wherein the flexible polymer electrolyte membrane has a conductivity of at least about $10^{-3} \Omega^{-1} cm^{-1}$ at ambient temperatures.

4. A flexible primary battery as recited in claim 1 wherein the molar ratio of the polymeric binder to the electrolyte in the flexible polymer electrolyte membrane is about 21:79, and wherein the molar ratio of the lithium salt to the organic aprotic solvent in the electrolyte of the flexible polymer electrolyte membrane is about 5:74.

5. A flexible primary battery as recited in claim 1 further comprising a flexible cathode within an encapsulating matrix.

6. A flexible primary battery as recited in claim 5 wherein the flexible cathode comprises a lithium intercalation compound powder dispersed in the encapsulating matrix.

7. A flexible primary battery as recited in claim 6 wherein the flexible cathode comprises about fifty to about seventy weight percent manganese dioxide, about twenty-five to about fifty weight percent encapsulating matrix, and up to about five weight percent carbon.

8. A flexible primary battery as recited in claim 5 wherein the flexible cathode further comprises an organic aprotic solvent solution of ethylene carbonate and propylene carbonate and gamma-butyrolactone in a molar ratio of about 1:2:1.

9. A flexible primary battery as recited in claim 1 wherein the battery is characterized by a cell voltage of at least about 2.5 volts when discharged with a current pulse of about 100 $\mu A/cm^2$, a pulse on-time of about 150 milliseconds and a pulse period of about one second while at a temperature of about −20° C.

10. A flexible primary battery as recited in claim 1 wherein the battery is a lithium battery.

11. A flexible primary battery as in claim 7 wherein the flexible cathode comprises about fifty-eight to about fifty-nine weight percent manganese dioxide, about forty weight percent encapsulating matrix, and about one to two weight percent carbon.

12. A flexible primary battery as in claim 11 wherein the flexible cathode comprises about fifty-nine weight percent manganese dioxide, about forty weight percent encapsulating matrix and about one weight percent carbon.

13. A flexible primary lithium battery suitable for microelectronics applications, the battery comprising:

a first flexible current collector;

a lithium anode contacting the first flexible current collector;

a flexible polymer electrolyte member contacting the lithium anode, the polymer electrolyte membrane comprising an electrolyte contained within a polymeric binder, the electrolyte comprising a lithium salt and an organic aprotic solvent solution, the organic aprotic solvent solution comprising ethylene carbonate, propylene carbonate and gamma-butyrolactone, the polymeric binder, lithium salt, ethylene carbonate, propylene carbonate and gamma-butyrolactone being present in the polymer electrolyte member in a molar ratio of about 21:5:30:24:20; and a flexible cathode contacting the flexible polymer electrolyte membrane, the cathode comprising a powder of lithium intercalation compound dispersed in an encapsulating matrix; and a second flexible current collector contacting the flexible cathode.

14. A flexible primary lithium battery as recited in claim 13 wherein the polymeric binder is polyacrylonitrile.

15. A flexible primary lithium battery as recited in claim 13 wherein the flexible polymer electrolyte membrane has a conductivity of at least about $10^{-3}\Omega^{-1}$ $cm^{-1}$ at ambient temperature.

16. A flexible primary lithium battery as recited in claim 13 wherein the flexible cathode comprises a powder of manganese dioxide dispersed in the encapsulating matrix.

17. A flexible primary lithium battery as recited in claim 16 wherein the flexible cathode comprises about fifty to about seventy weight percent manganese dioxide, about twenty-five to about fifty weight percent of the encapsulating matrix, and up to about five weight percent carbon.

18. A flexible primary lithium battery as recited in claim 13 wherein the flexible cathode further comprises an organic aprotic solvent solution of ethylene carbonate and propylene carbonate and gamma-butyrolactone in a molar ratio of about 17:37:20.

19. A flexible primary lithium battery as recited in claim 13 wherein the battery is characterized by a cell voltage of at least about 2.5 volts when discharged with a current pulse of about 100 $\mu A/cm^2$, a pulse on-time of about 150 milliseconds and a pulse period of about one second while at a temperature of about −20° C.

20. A flexible primary battery as in claim 17 wherein the flexible cathode comprises about fifty-eight to about fifty-nine weight percent manganese dioxide, about forty weight percent encapsulating matrix, and about one to two weight percent carbon.

21. A flexible primary battery as in claim 20 wherein the flexible cathode comprises about fifty-nine weight percent manganese dioxide, about forty weight percent encapsulating matrix and about one weight percent carbon.

* * * * *